Oct. 22, 1968

G. R. HUNT 3,406,900

POWERED SLIDE RULE ASSEMBLY

Filed Oct. 7, 1966

INVENTOR.
GEORGE R. HUNT
BY
MARCUS L. BATES

Oct. 22, 1968 G. R. HUNT 3,406,900
POWERED SLIDE RULE ASSEMBLY
Filed Oct. 7, 1966 2 Sheets-Sheet 2

INVENTOR.
GEORGE R. HUNT
BY
MARCUS L. BATES

United States Patent Office 3,406,900
Patented Oct. 22, 1968

3,406,900
POWERED SLIDE RULE ASSEMBLY
George R. Hunt, 1008 W. 23rd St.,
Odessa, Tex. 79760
Filed Oct. 7, 1966, Ser. No. 585,044
10 Claims. (Cl. 235—70)

This invention generally relates to a device for training large groups of students at one time by the provision of a slide rule that is exaggerated in size so as to enable members of an average size classroom to visually observe the manipulations carried out upon the slide rule, although the slide rule may be placed a considerable distance from the students, such as the head of the classroom. The instructor, or person manipulating the slide rule, is provided with control means remotely located from the slide rule structure that enables the instructor to sit at any place he deems desirable within the classroom, and at the same time carry out all the necessary manipulative actions required to operate the slide rule.

In teaching the art of using the slide rule, various visual aids have heretofore been employed including projection of a simulated slide rule upon a screen located against a wall of a classroom, as well as employing a large model of a slide rule having numerals thereon of a size which enables everyone to observe the action of the slide rule as it is manipulated to demonstrate the solution to various problems that may be used in conjunction therewith. The first method, that of projecting the image of the slide rule upon a flat surface such as a wall, has the obvious serious disadvantage of requiring a darkened room, and also fails to provide the student with a true replica of the slide rule. The second method, while being more desirable than the first method in that it offers a true replica of a slide rule, is cumbersome for the slide rule is usually improperly secured relative to the floor whereby it swings about during manipulation causing distraction of the students. The operation also requires so much of the instructors attention and energy that it is necessary to discontinue the lecture while setting the instrument, thus interrupting the smooth flow of the lesson. Furthermore, the instructor must impose himself between the students and the slide rule in order to carry out the proper mechanical operations of the slide rule.

It is therefore desirable that a classroom slide rule be rigidly mounted relative to the floor of the room.

It is furthermore desirable that a slide rule of the instant type be remotely operated so as to enable the instructor to centrally position himself with respect to the students to thereby maintain direct communication with them, and more importantly to avoid obstructing and distracting the students by interposing his person between the slide rule and the students.

It is also desirable that a slide rule of the instant type be rapidly and efficiently manipulated in a manner directly controlled by the instructor so as to enable him to duplicate the operations carried out on a conventional hand held slide rule. This includes movement of the slide, movement of the hairline, and reversing the slide rule so as to disclose the opposite side thereof.

Therefore a primary object of this invention is to overcome the inadequacies and deficiencies of slide rule visual aid devices of the past art, as discussed above, and to provide a slide rule made in accordance with the instant invention that attains the above described desirable attributes.

Another object of this invention is to provide a slide rule that may be used in a large classroom for simultaneously teaching the use of the slide rule to a large number of students.

Another object of this invention is to provide a slide rule that is exaggerated in size and that may be made into the exact replica of a conventional hand held type slide rule that is provided with indicia thereon that can be readily observed and comprehended by anyone seated in a classroom.

Another object of this invention is to provide a slide rule which is suitably mounted upon a supporting device, and wherein the slide element and hairline are provided with powered means whereby they may be separately actuated to effect movement longitudinally of the slide rule body in either desired direction; and wherein the slide rule further includes powered means for rapidly rotating the slide rule 180 degrees about its longitudinal axis so as to reveal either side thereof.

Another object of this invention is to provide a slide rule that includes electrical powered means for moving the various movable portions of the slide rule with respect to the main body thereof that includes remote control means.

Another object of this invention is to provide a slide rule having a motor driven powered means for actuating the slide and indicator thereon.

Another object of this invention is to provide a slide rule of the instant type that includes pneumatically powered means for moving the slide element associated therewith.

A still further object of this invention is to provide a slide rule having electrical powered means associated therewith that includes a flexible cable associated with pulleys for effecting movement of the slide element.

The above objects are attained in accordance with this invention by the provision of a slide rule mechanism having a movable slide element associated therewith that includes a longitudinally extending gear that is associated with a motor driven gear located at each extremity of the rule and engaged with the gear on the slide; and wherein the indicator includes a motor driven threaded shaft that cooperates in threaded engagement with a portion of the indicator so as to selectively enable the indicator and slide portion of the slide rule to be selectively positioned with respect to the main body of the slide rule.

Other objects and advantages of this invention will be readily appreciated and better understood by reference to the following detailed description when considered in conjunction with the accompanying drawings wherein.

Figure 1:
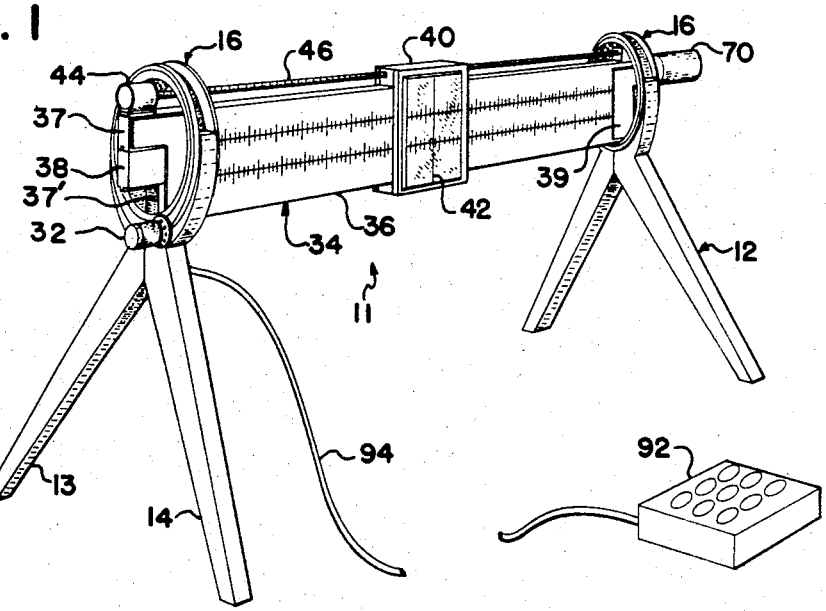
FIGURE 1 is a perspective view of the slide rule shown in operative relationship with a stand that forms a part of this invention.
Figure 2:
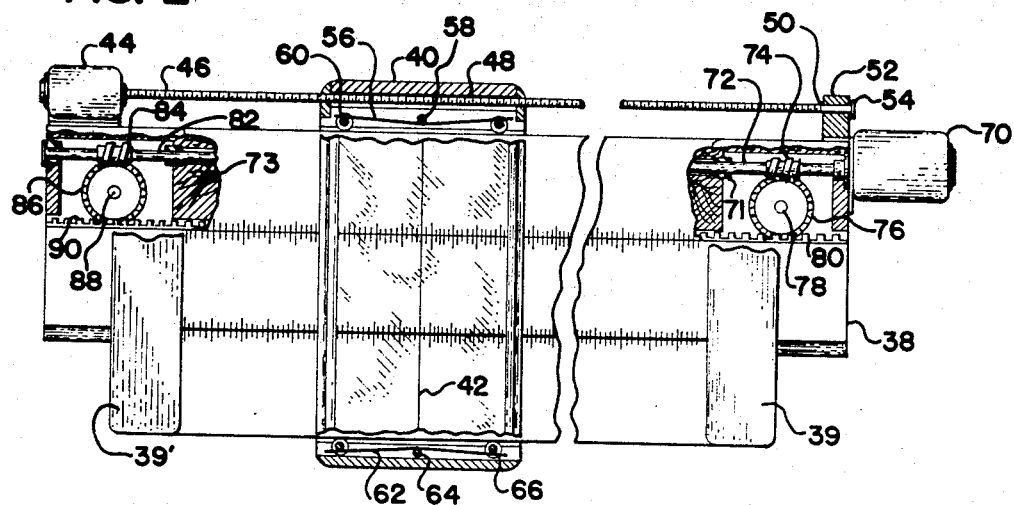
FIGURE 2 is a side elevational view, with some parts broken away, and other parts shown in cross-section in order to better illustrate some of the details thereof.
Figure 3:
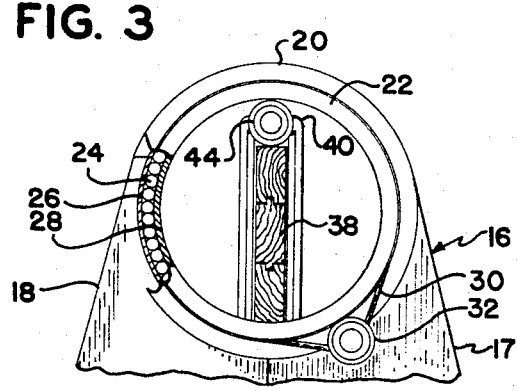
FIGURE 3 shows an end view of the device with some parts broken away and shown in section in order to better illustrate the details thereof.

Looking now to the details of FIGURE 1 in conjunction with FIGURES 2 and 3, there is seen therein a slide rule generally illustrated by the arrow at numeral 11, that is suitably mounted upon a pair of scissor-like supporting clamps 12. The slide rule of the instant invention is preferably greatly enlarged in size so as to enable indicia to be placed thereon that is of a sufficient size to enable the slide rule to be visually comprehended from a distance of about thirty feet.

Each leg 13 and 14 of the pair of scissor-like suspension means or clamp 12 are preferably hinged together so as to form an attachment means in the form of a yoke 16 that includes clamps 17 and 18 which are extensions of the legs 13 and 14 respectively. The yoke 16 engages an outer groove or annulus at 20 in a manner whereby the weight of the entire slide rule assembly upon each of the leg assemblies 12 forces each side 17 and 18 of the yoke 16 into tight engagement with the outer groove 20. Rotatably mounted adjacent to the outer groove 20 is a rotatable pulley that is rigidly attached to the slide rule body and mounted outwardly with respect to the groove 20 by means of low friction bearing means 24. The bearings 24 are disposed between the fixed race 26 and the movable inside race 28. The rotatable pulley 22 is an integral part of the inside race 28. A belt 30 is connected between a reversable motor 32 and the pulley 22 so as to enable rotation of the pulley in either direction.

While the construction of legs 13 and 14 are shown as built-up light weight members, it is considered within the comprehension of those skilled in the art to fabricate the legs and clamp assembly from light tubular members while remaining within the specific teaching of FIGURES 1, 2 and 3.

The main body 34 of the slide rule includes spaced apart parallel slide rule elements with the lowermost element being generally indicated by the numeral 36, and one end portion of which may be seen at numeral 37'. Slide element 38 is suitably fitted in the illustrated tongue and groove relation between the upper and lower horizontal spaced apart parallel slide rule elements. Reinforcing bridge members 39 and 39' hold the before mentioned spaced apart slide rule elements rigidly affixed to each other and additionally forms a mount means for the motors that power the slide rule.

Indicator 40 includes a transparent member having hairline 42 vertically disposed thereon. Reversible motor 44 drives a threaded shaft 46 located inside the interiorly threaded passageway 48 that is centrally located near the upper extremity of the indicator. The shaft is journaled at 50 within the pillow 52 and includes enlargement 54 that maintains the threaded shaft 46 rotatably positioned with respect to the slide rule.

An upper spring 56 in the form of a leaf-spring biases the indicator in an upper direction by means of a pin 58 that is rigidly attached to the indicator, and rollers 60 that are biased against the top portion of the slide rule. The lower extremity of the indicator is similarly biased but in a downward direction by means of leaf-spring 62 having a fixed pin 64 integrally attached to the indicator, and spaced apart rollers 66 that slidably engage the lower extremity of the slide rule.

A reversible motor 70 is rigidly attached to one of the before mentioned bridge members 39 and includes a right hand and left hand drive mechanism. The right hand drive mechanism includes a bushing 71 rigidly attached to the main body of the slide rule which receives a shaft 72 therein. A worm gear 74 is rigidly attached to the drive shaft 72, in order to drive the intermediate sprocket 76. The sprocket is journaled to the main body of the slide rule by pin 78 that maintains the sprocket properly engaged with the gear teeth 80. The left hand drive assembly includes the depending end of the shaft 82, which is a continuation of the before mentioned shaft seen at numeral 72, and a left hand worm-gear 84 that drives the left hand intermediate sprocket 86 that is mounted in journaled relationship by means of a pin 88 attached to the slide rule body. The intermediate sprocket 86 drives the left hand side of the slide element 38 as illustrated in FIGURE 2. The line of gear teeth 90 is a continuation of the right hand gear teeth seen at numeral 80. At least one sprocket, 76 or 86, is always engaged with the line teeth 80 or 90.

As an alternate embodiment the slide indicator could be provided with a motor located at either the top or bottom thereof, that engages the main slide rule body, with current being supplied through sliding metal contacts.

Figure 4:
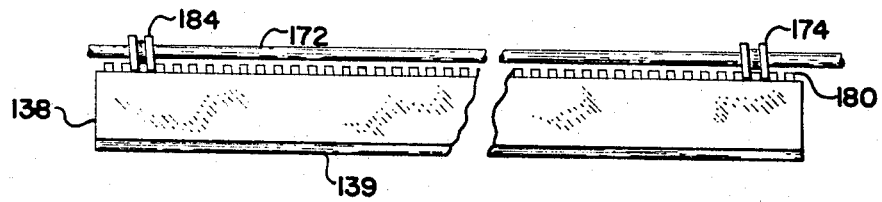
FIGURE 4 is a partial fragmentary view showing an alternate embodiment of the invention.

Looking now to the details of FIGURE 4, wherein there is seen a slide element 138 having reduced marginal edge portions 139 and 180 that cooperate with the main body portion in a tongue and groove manner similar to that seen in FIGURES 1 through 3, and as specifically illustrated in FIGURE 3. The upper reduced marginal edge portion is made into the form of a line of gear teeth, illustrated by numeral 180, which cooperates with a shaft 172 having worm gears 174 and 184 thereon which drive the slide element 138 in either direction in accordance with the direction of rotation of a motor (not shown) attached to shaft 172 in a manner similar to that illustrated in conjunction with FIGURE 2.

Figure 5:
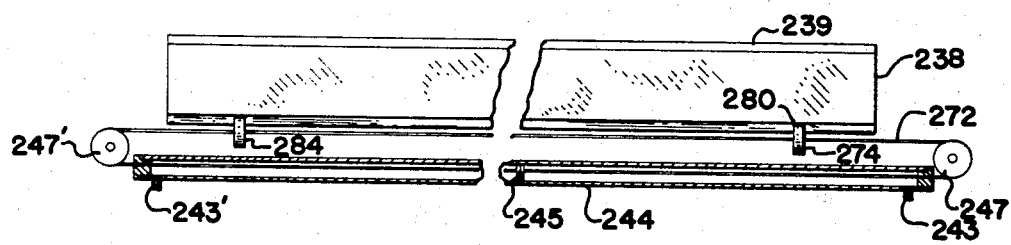
FIGURE 5 is a fragmentary view of an alternate embodiment made in accordance with the teachings of this invention.

FIGURE 5 illustrates a pneumatically operated slide element 238 that includes upper and lower tongues adapted to cooperate with a groove located in the main body of a slide rule. The pneumatic conduits 243 and 243' are adapted to be suitably connected to a controlled source of fluid pressure. An elongated cylindrical tube 244 carries a piston 245 therewithin in a manner that a differential in pressure across conduits 243 and 243' will cause the piston 245 to reciprocate within the cylinder 244. A pair of spaced apart pulleys 247 and 247' form a guide means for a cable 272. Spaced apart cogs 274 and 284 cooperate with spaced apart apertures, or slots, one of which is seen at numeral 280, so as to drive the slide element 238 in either direction in accordance with the movement of the piston 245.

Figure 6:
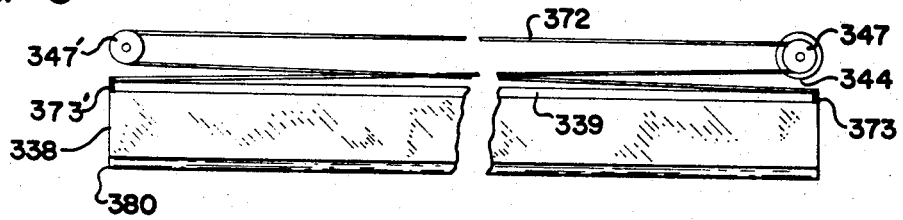
FIGURE 6 is a fragmentary view of still another embodiment made in accordance with the teachings of this invention.

FIGURE 6 illustrates still another embodiment of the power drive means for the slide element wherein a reversible electric motor 344 drives a set of pulleys 347 and 347' by means of a cable 372 that is attached to opposite end portions 373 and 373' of the slide element 338 of a slide rule. The slide element 338 includes upper and lower tongue elements 339 and 380 that cooperate with an upper and lower groove in the main body of the slide rule, in a manner similar to that illustrated in FIGURE 3.

Figure 7:
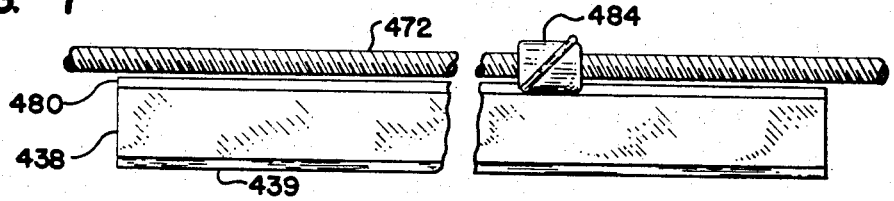
FIGURE 7 is a fragmentary view illustrating still another embodiment made in accordance with the teachings of this invention.
Figure 8:
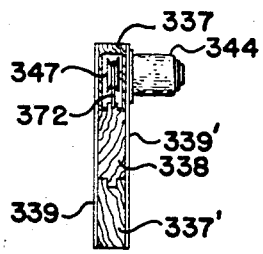
FIGURE 8 is a cross-sectional view of FIGURE 6.

The embodiment of FIGURE 7 includes a slide element 438 having a lower tongue element 439 and upper tongue element 480 that cooperates with lower and upper grooves located in the main body of a slide rule in a manner similar to that previously discussed in conjunction with FIGURES 2 and 3. The reversible motor driven threaded shaft 472 drives a ball bearing nut 484 to thereby reciprocate the slide element 438 longitudinally with respect to the main body of the slide rule. The ball bearing nut 484 is rigidly attached to the upper portion of the slide element 438, and accordingly, rotational motion of the threaded shaft 472 causes the slide element 438 to move with respect to the shaft 472.

In operation, the slide rule illustrated in the embodiment of FIGURES 1 through 3 is best understood by considering the device to be comprised of three major portions. The first portion includes the before described mechanism for rotating the slide rule about the longitudinal axis thereof. The second portion includes the mechanism for effecting movement of the indicator, and the third portion includes the mechanism related to effecting movement of the slide element. These three major portions cooperate together in a manner to form the slide rule assembly that is supported by the two support means illustrated by the numeral 12.

Assembly and disassembly of the slide rule may be readily carried out by merely lifting the entire slide rule assembly 34 and placing the yoke 16 of each support means within the outer annular race assembly 20.

Remote control assembly 92 actuates the three motors 32, 44, and 70 in a manner that rotates the entire slide rule within the ring of each stand, moves the indicator 40 to the right or the left an amount sufficient to align the hairline 42 of the indicator 40 with any of the indicia located on the main body 36, and moves the slide element 38 to the right or left to thereby enable any of the indicia associated with the slide element 38 to be placed adjacent any of the indicia located on the main body 36. Motor 32 rotates the entire slide rule assembly 180 degrees in either direction about the longitudinal axis so as to rapidly enable visual observation of the indicia located on either side of the slide rule.

The reversibility of the slide rule is best understood from FIGURES 1 and 3, wherein there is illustrated the slide rule 34 that is attached to a bearing race 28 that is rotatably mounted by low friction bearing means 24 to an outside bearing race 26. To the inside bearing race 28 is integrally attached a pulley 22. The outside bearing race 26 is integrally connected to two spaced apart walls which form a depression or groove therebetween that is fabricated to substantially the same dimensions of each of the yokes 17 and 18, to thereby permit the yokes to be friction fitted therein in a manner similar to a pair of lifting tongs. Since the weight of the entire device is placed upon the yoke assembly at 16, the legs 13 and 14 are spread apart by the weight of the device thereby causing the yoke members 17 and 18 to firmly grasp the annulus formed by the spaced apart walls 20.

The instructor can sit among the students of the class with the remote control unit 92 placed conveniently before him and carry out the above manipulations of motors 32, 44, and 70 by merely depressing various switches associated with the control unit 92. Safety switches may be provided for each motor so that when the element it operates reaches an extreme position, the current is cut off to thereby prevent an element from being driven too far in one direction. Motor 32 may be equipped with dynamic breaking so as to enable the rotation of the slide rule to stop almost immediately upon lifting ones finger from the switch controlling the rotation of the motor. Motors 44 and 70 do not require dynamic breaking since the various gears associated therewith permits very little free-wheeling of the motor upon de-energization thereof. The details of the control circuitry for the motors 32, 44, and 70 are not set forth herein since the circuitry is within the comprehension of those skilled in the art and merely involves elementary circuitry. The various motors may be powered by either AC or DC current, however, DC is preferred since this type of motor has a wide range of speeds and large starting torque. Where DC motors are incorporated into the design, a selenium rectifier may be included in the remote control device 92.

Looking now to the details of the embodiment of FIGURE 4, it will now be understood by those skilled in the art that the intermediate sprockets 76 and 86 of FIGURES 1 through 3 have been eliminated so as to permit the train of gear teeth 180 to be directly driven by the worm gear on shaft 172. This arrangement eliminates lost motion between the shaft 172 and the slide element 138, but at the same time requires the motor that drives the shaft 172 to be offset an amount sufficient to clear the slide element 138 to clear the motor as the slide element is extended toward and beyond the motor. Two worm gears 174 and 184 are required in conjunction with the slide element 138 since the line of gear teeth 180 leaves the worm gear 174 when the slide element is in the extreme left hand position, and the teeth 180 leaves the worm gear 184 when the slide element 138 is in the extreme right hand position. Hence the train of gear teeth 180 must be readily engageable and disengeageable with either of the worm gears 174 and 184 during the operation of the slide rule.

Looking to the details of the embodiment illustrated in FIGURE 5, wherein two cogs or enlargements, 274 and 284, are securely attached to a cable 272 to thereby engage a slot 280 located in the tongue of the slide element 238, it should now be realized that the pulleys 247 and 247' are spaced apart an amount sufficient to allow the slide element 238 to reciprocate within the main body of a slide rule an amount to enable travel of the slide element 238 over the major portion of a conventional scale located on the main body of the slide rule. The enlargements 274 and 284 cooperate with the slot in the slide element 238 in a manner to actuate the slide element 238 when one or more of the enlargements, 274 and 284, are engaged with their respective slots. Application of pneumatic pressure at conduit 243 drives the piston 245 to the left thereby moving the slide element 238 to the right, and conversely, application of pneumatic pressure at conduit 243' drives the piston 245 to the right thereby moving the slide element 238 to the left.

FIGURE 6 illustrates another embodiment of the instant invention wherein the slide element 338 is actuated by a cable 372 which in turn is actuated by action of the motor driven pulley 347. In this embodiment, the slide element 338 can be moved to the extreme right or left hand position with respect to the main body of the slide rule since the ends of the cable are disposed in criss-crossed relationship that enables the end at 373', for example, to be moved to the right hand extremity of the slide rule structure to position it substantially adjacent the pulley 347.

In the embodiment of FIGURE 7, the slide element 438 is rigidly attached to a ball-bearing nut 484 so as to enable the drive shaft 472 to cooperate in threaded relationship with the ball bearing nut so that rotational movement of the shaft 427 causes longitudinal movement of the slide element with respect to the shaft an amount slightly more than one half of the scale of the main body.

While I have shown and described what I believe to be several preferred embodiments of my invention, it will be understood by those skilled in the art that various changes may be made without departing from the broad scope of the invention. Therefore the metes and bounds of the intellectual property deemed to be my invention should be considered as defined by the following claims.

I claim:

1. In a slide rule having an elongated main body, a slide element, and an indicator associated therewith, the improvement comprising:
   first means associated with said slide rule adapted to selectively rotate said slide rule in either direction about the longitudinal axis thereof;
   second means associated with said slide rule adapted to move said slide element longitudinally and in either direction with respect to said main body;
   third means associated with said slide rule adapted to longitudinally move said indicator in either direction with respect to said main body;
   and remote control means connected to said first, second, and third means for selectively energizing said first, second, and third means to thereby controllably actuate said first, second, and third means in either desired direction of movement.

2. The combination of claim 1, and further including a suspension means associated with said first means for supporting said slide rule;
   said suspension means including a first and second member hinged together to provide a clamp having legs depending therefrom;
   said slide rule having an annular ring at each extremity thereof and substantially the size of said clamp;
   whereby said clamp removably engages each said annular ring to thereby provide a detachable support for said slide rule.

3. The combination of claim 1 wherein said first means associated with said slide rule includes a motor;
   said slide rule including a rotatable annular support means at each extremity thereof;
   and means associated with said motor and said support means for effecting rotation of said slide rule about the longitudinal axis thereof upon energization of said motor.

4. The combination of claim 1, wherein said second means further includes an elongated motor driven shaft having gear means at each extremity thereof;
a sprocket located at each extremity of the slide rule and journaled to the main body of said slide rule;
said slide element having a line of gear teeth associated with a marginal edge portion thereof;
said gear means, said sprocket, and said line of gear teeth being meshed together whereby rotation of said motor causes at least one of said sprockets to move said slide element longitudinally of said slide rule body in accordance with the direction of rotation of said motor.

5. The combination of claim 1, wherein said third means further includes;
an elongated motor driven threaded shaft located coextensive with said slide rule;
said indicator including a threaded passageway at one end thereof;
said threaded rod being received within said passageway;
whereby rotation of said motor driven threaded shaft causes said indicator to move longitudinally of the main slide rule body in accordance with the direction of rotation of said motor.

6. The combination of claim 1, wherein said second means associated with said slide element includes a line of gear teeth associated with a marginal edge portion thereof;
a motor driven shaft having means forming a gear at each extremity thereof;
said gear and said line of gear teeth being meshed together whereby rotation of said shaft causes said slide element to move longitudinally with respect to said main body of the slide rule and in a direction dependent upon the direction of rotation of said shaft.

7. The combination of claim 1, wherein said second means associated with said slide element includes two spaced apart slots;
a cable, spaced apart enlargements, spaced apart pulleys, a cylinder, a piston located within said cylinder, spaced apart pneumatic conduits each located at the free end of said cylinder with said piston slidably located therebetween;
means connecting said cable to said piston and said spaced apart enlargements, with said pulleys maintaining said enlargements in properly aligned relationship with said slide element and said cylinder;
said enlargements being removably received within said slots; whereby:
reciprocation of said piston within said cylinder causes said cable to impart longitudinal motion to said slide element with respect to said main body and in accordance with the pressure differential between said conduits.

8. The combination of claim 1, wherein said second means associated with said slide element further includes:
spaced apart pulleys horizontally aligned with said slide element to form guide means for a cable;
drive means associated with one of said pulleys to form a driven pulley;
a cable attached to the depending end of said slide element furthest removed from said driven pulley;
an opposite end of said cable being connected to the remaining end of said slide element, whereby:
said cable is arranged about each said pulley to thereby drive said slide element longitudinally of said slide rule body.

9. The combination of claim 1, and wherein said second means further includes:
a threaded motor driven shaft, a ball bearing nut, and means connecting said nut to a marginal edge portion of said slide element;
said shaft being threadedly received within said nut, whereby:
rotational motion of said shaft moves said slide element longitudinally of said slide rule main body.

10. The combination of claim 1, and further including:
a suspension means associated with said first means for supporting said slide rule;
said suspension means including a first and second member hinged to provide a clamp having legs depending therefrom;
said slide rule having an annular ring at each extremity thereof and substantially the size of said clamp;
whereby: said clamp removably engages each said annular ring to thereby provide a detachable support for said slide rule;
said first means associated with said slide rule includes a motor;
and means associated with said motor and said support means for effecting rotation of said slide rule about the longitudinal axis thereof upon energization of said motor;
said third means includes an elongated motor driven threaded shaft located coextensive with said slide rule;
said indicator including a threaded passageway at one end thereof;
said threaded rod being received within said passageway; whereby:
rotation of said motor driven threaded shaft causes said indicator to move longitudinally of the main slide rule body in accordance with the direction of rotation of said motor.

References Cited

UNITED STATES PATENTS

| | | | |
|---|---|---|---|
| 1,802,603 | 4/1931 | Herm | 235—69 |
| 2,650,762 | 9/1953 | Toien | 235—79.5 |
| 3,005,269 | 10/1961 | Woolley | 35—39 |
| 3,232,532 | 2/1966 | Vom Dorp et al. | 235—79.5 |

STEPHEN J. TOMSKY, *Primary Examiner.*